Figure 1:
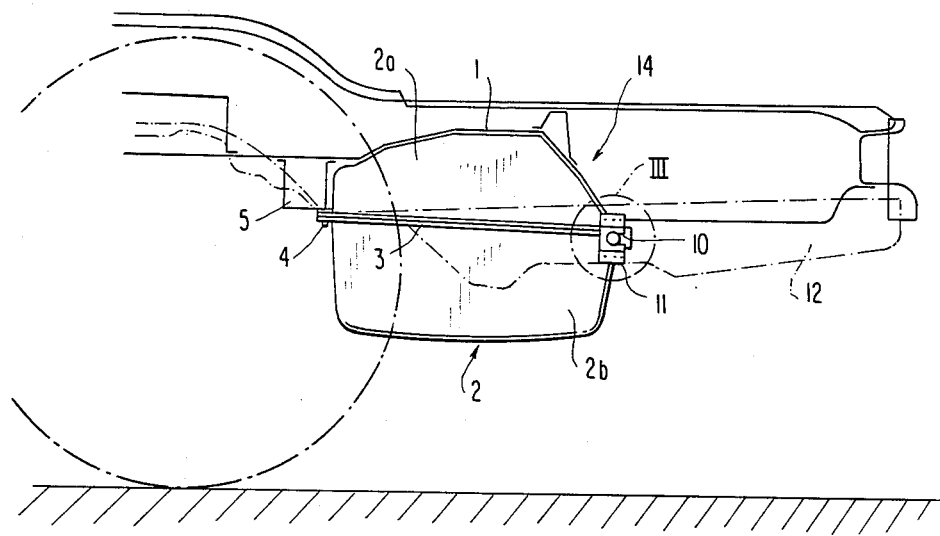

United States Patent [19]

Knöchelmann et al.

[11] Patent Number: 4,621,822

[45] Date of Patent: Nov. 11, 1986

[54] ARRANGEMENT OF A FUEL TANK IN THE REAR REGION OF A MOTOR VEHICLE

[75] Inventors: Fred Knöchelmann, Grafenau; Manfred Schulz, Wildberg; Günther Ast, Horb, all of Fed. Rep. of Germany

[73] Assignee: Daimler-Benz Aktiengesellschaft, Stuttgart, Fed. Rep. of Germany

[21] Appl. No.: 748,829

[22] Filed: Jun. 26, 1985

[51] Int. Cl.⁴ .............................................. B60K 15/08
[52] U.S. Cl. ..................................................... 280/5 A
[58] Field of Search ..................... 280/5 A, 5 R, 784; 180/68.4, 68.6, 232, 314; 49/381, 383, 385; 296/189

[56] References Cited

U.S. PATENT DOCUMENTS

| 4,371,181 | 2/1983 | Monigold | 280/5 A |
| 4,416,461 | 11/1983 | Hayashi | 280/5 A |
| 4,541,645 | 9/1985 | Foeldesi | 180/68.4 |

FOREIGN PATENT DOCUMENTS

| 77697 | 4/1983 | European Pat. Off. | 280/5 A |
| 2152136 | 4/1973 | Fed. Rep. of Germany | 180/232 |
| 2828715 | 9/1979 | Fed. Rep. of Germany | 280/5 A |

Primary Examiner—John J. Love
Assistant Examiner—Everett G. Diederiks, Jr.
Attorney, Agent, or Firm—Barnes & Thornburg

[57] ABSTRACT

A fuel tank configured for universal use in the rear region of motor vehicles beneath the vehicle floor is mounted so that it can yield in the case of a rear deformation caused by an accident. The fuel tank is connected firmly to parts fixed to the vehicle in the forward region of the fuel tank in the direction of travel and is retained laterally in the rear region of the fuel tank in the direction of travel by guide bolts or the like in guides with slots open towards the rear, the guides being fixed to the vehicle frame and extending horizontally in the longitudinal direction of the vehicle, so that upon rear impact, foreshortening of the vehicle frame causes the guide bolts to leave the guide slots resulting in downward rotation of the rear part of the fuel tank.

10 Claims, 4 Drawing Figures

ARRANGEMENT OF A FUEL TANK IN THE REAR REGION OF A MOTOR VEHICLE

The invention relates to an arrangement of a fuel tank in the rear region of a motor vehicle beneath the vehicle floor, wherein the fuel tank is mounted so that it can yield in the case of rear deformation caused by an accident, for example, impact received from the rear.

Such an arrangement of a fuel tank has already been disclosed in German Auslegeschrift No. 2,828,715. However, the known arrangement is only applicable within the context of specific structural conditions, namely if the fuel tank is stressed by a spare wheel, likewise arranged beneath the vehicle floor, in the case of a rear collision, and if the structure of the vehicle admits a pivoting of the fuel tank upwards.

In contrast to the above, it is an object of the present invention to develop an arrangement of a fuel tank of the type defined above which is applicable to motor vehicles generally.

According to the invention, when the fuel tank is connected firmly to parts fixed to the vehicle in its forward region in the direction of travel, it is in addition retained laterally in its rear region in the direction of travel by members, for example guide bolts in guide means open towards the rear, fixed to the vehicle and extending horizontally in the longitudinal direction of the vehicle.

It is an object of the invention to construct an arrangement of a fuel tank in the rear region of a motor vehicle beneath the vehicle floor wherein the fuel tank is mounted so that it can yield in the case of rear deformation caused by an accident, the fuel tank being connected firmly to parts fixed to the vehicle in its forward region in the direction of travel and retained laterally in its rear region in the direction of travel by guide bolts or the like within guide means open towards the rear, fixed to the vehicle and extending horizontally in the longitudinal direction of the vehicle.

It is another object of the invention to construct a fuel tank for a rear region of a motor vehicle, the front fastening of the tank occurring in the region of a transversely extending welded flange between an upper shell and a lower shell of the fuel tank.

It is another object of the invention to construct an arrangement of a fuel tank in the rear region of a motor vehicle beneath the vehicle floor wherein is provided guide means arranged in straps fastened to lateral stringers of the vehicle.

It is another object of the invention to construct an arrangement of a fuel tank in the rear region of a motor vehicle beneath the vehicle floor, the tank being retained laterally in its rear region by guide bolts enclosed by a bushing of resilient material.

It is another object of the invention to provide an arrangement of a fuel tank in the rear region of a motor vehicle beneath the vehicle floor, the fuel tank being retained laterally in its rear region in the direction of travel by guide bolts arranged each in an angle bracket fastened by a screw connection to the fuel tank.

It is another object of the invention to construct an arrangement of a fuel tank in the rear region of a motor vehicle beneath the vehicle floor, the side of an upper shell of the fuel tank pointing to the rear and regions of the floor plate of the vehicle arranged thereabove forming a slope rising from rear to front of the fuel tank.

Figure 2:
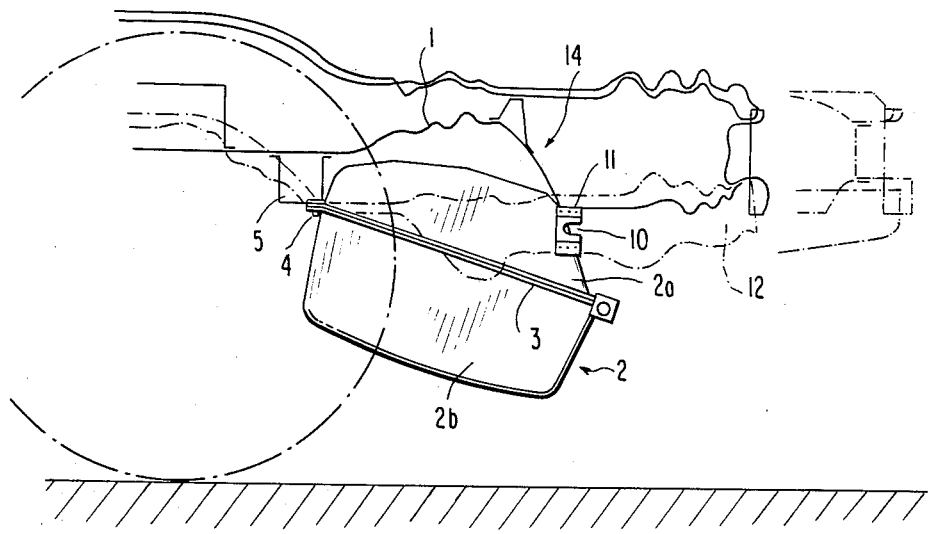
Figure 3:
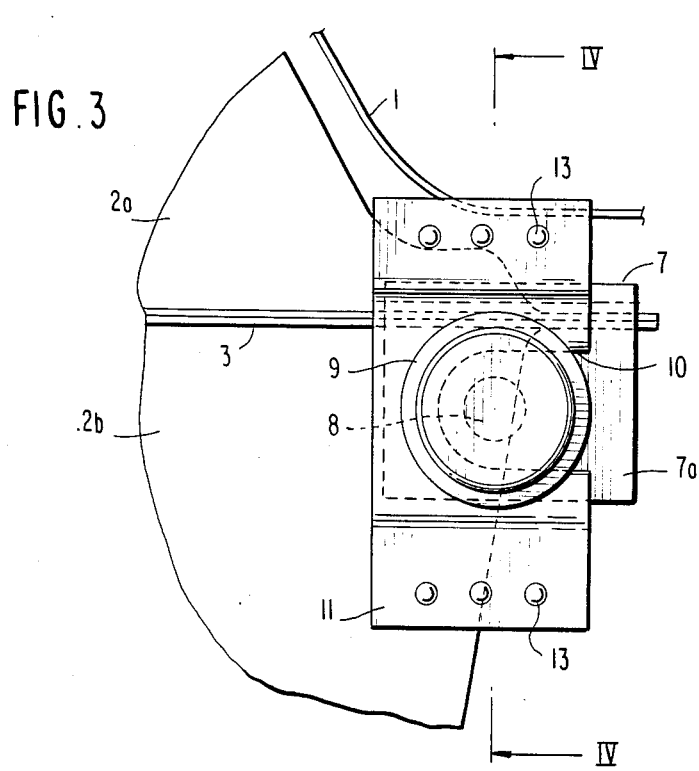
Figure 4:
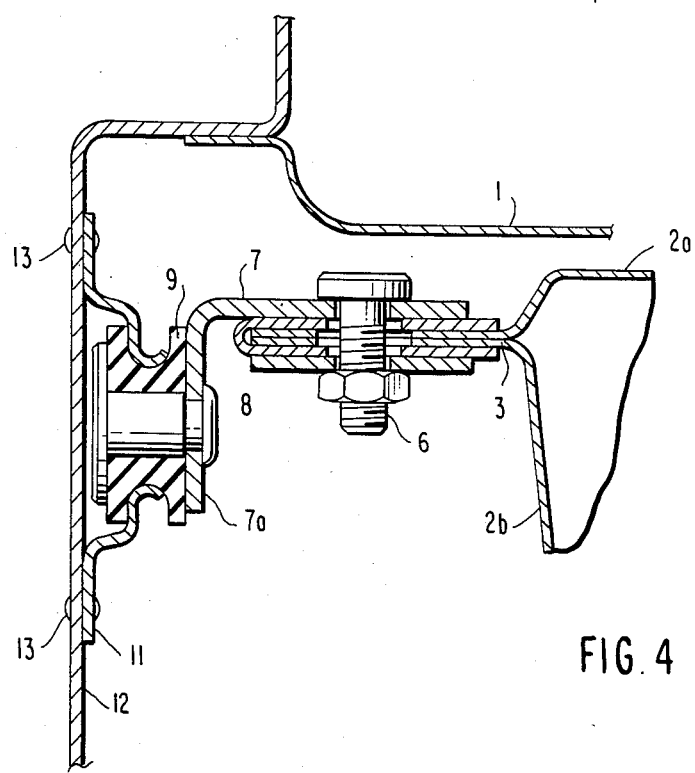

These and other objects, features and advantages of the present invention will become more apparent from the following description when taken in connection with the accompanying drawings which show, for the purposes of illustration only, one embodiment in accordance with the present invention, and wherein:

FIG. 1 shows a section in the longitudinal direction of the vehicle through the rear region of the chassis of a motor vehicle in a design state, FIG. 2 shows a section corresponding to that according to FIG. 1, but after a rear collision has occurred, FIG. 3 shows on a larger scale the detail 'III' from FIG. 1, and FIG. 4 shows a section made along the line IV—IV in FIG. 3.

Referring now to the drawings wherein like reference numerals are used to designate like parts and more particularly to FIG. 1, in the rear region of a motor vehicle, not shown in detail, there is arranged beneath its floor plate 1 a fuel tank 2, which is composed of an upper shell 2a and a lower shell 2b, which are mutually connected in the region of a flange arrangement 3.

At the front of the fuel tank 2, in the direction of travel, the fuel tank 2 is connected firmly at its flange arrangement 3 by a screw connection 4 to a vehicle cross member 5.

The rear fastening of the fuel tank 2 is chosen so that the fuel tank 2 releases itself from its mounting and pivots downwards about the front screw connection 4 in the case of a deformation of the vehicle structure caused by a rear collision.

For this purpose, as may be seen particularly from FIGS. 3 and 4, the flange arrangement 3 is mounted by a screw 6 on each side of the vehicle to an angle bracket 7 which carries on its free member 7a a guide bolt 8 which is enclosed by a bushing 9 of resilient material. This guide bolt 8 cooperates with a guide means 10, FIG. 3, open towards the rear, in a strap 11, which is fastened to a stringer 12 of the vehicle structure by spot welds 13.

Now if the stringers 12 are upset by a rear collision, as is illustrated in FIG. 2 of the drawing, the dimensional foreshortening of the stringer 12 between the screw connection 4 and straps 11, the fuel tank 2 remaining relatively undeformed, causes the guide bolts 8 to leave the respective associated guide means 10, and the fuel tank 2 pivots downwards about a transverse axis which is defined by the front screw connections 4. This pivoting of the fuel tank is favored by a corresponding configuration of the side of the upper shell 2a of the fuel tank 2 which slopes to the rear, and of the corresponding regions of the floor plate 1 located thereabove, which form a slope 14 rising from rear to front.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. An arrangement of a fuel tank in the rear region of a motor vehicle having lateral stringers beneath the vehicle floor, so that the fuel tank can yield in the case of rear deformation caused by an accident, comprising means for connecting the fuel tank to parts fixed to the vehicle in the forward region of the fuel tank in the direction of travel, guide bolts mounted laterally to the rear region of the fuel tank in the direction of travel and guide means open towards the rear of the vehicle and fixed to the lateral stringers, and extending horizontally in the longitudinal direction of movement of the vehicle laterally retaining the guide bolts for releasing the fuel tank from support by said lateral stringers upon rear deformation of said vehicle.

2. An arrangement of a fuel tank according to claim 1 wherein the fuel tank comprises an upper shell and a lower shell, a transversely extending welded flange forming the upper and lower shells, and wherein the means for connecting is located in the region of said transversely extending welded flange.

3. An arrangement of a fuel tank according to claim 1, wherein the guide means are disposed in straps fastened to said lateral stringers of the vehicle.

4. An arrangement of a fuel tank according to claim 3, wherein the vehicle comprises a floor plate sloping downwardly from front to rear in the direction of vehicle motion and the fuel tank comprises an upper shell and a lower shell joined to the upper shell and a surface of the upper shell slopes downwardly from front to rear in the direction of vehicle motion.

5. An arrangement of a fuel tank according to claim 1, wherein the guide bolts are enclosed by a bushing of resilient material.

6. An arrangement of a fuel tank according to claim 5, wherein the vehicle comprises a floor plate sloping downwardly from front to rear in the direction of vehicle motion and the fuel tank comprises an upper shell and a lower shell joined to the upper shell and a surface of the upper shell slopes downwardly from front to rear in the direction of vehicle motion.

7. An arrangement of a fuel tank according to claim 1, wherein the guide bolts are mounted each in an angle bracket fastened by a screw connection to the fuel tank.

8. An arrangement of a fuel tank according to claim 7, wherein the vehicle comprises a floor plate sloping downwardly from front to rear in the direction of vehicle motion and the fuel tank comprises an upper shell and a lower shell joined to the upper shell and a surface of the upper shell slopes downwardly from front to rear in the direction of vehicle motion.

9. An arrangement of a fuel tank according to claim 1, wherein the vehicle comprises a floor plate sloping downwardly from front to rear in the direction of vehicle motion and the fuel tank comprises an upper shell and a lower shell joined to the upper shell and a surface of the upper shell slopes downwardly from front to rear in the direction of vehicle motion.

10. An arrangement according to claim 1, wherein the vehicle comprises a floor plate sloping downwardly from front to rear in the direction of vehicle motion and the fuel tank comprises an upper shell and a lower shell juoined to the upper shell by a transversely extending welded flange, and a surface of the upper shell slopes downwardly from front to rear in the direction of vehicle motion.

* * * * *